(12) United States Patent
Lee

(10) Patent No.: US 7,747,950 B2
(45) Date of Patent: Jun. 29, 2010

(54) METHOD FOR INPUTTING CHINESE CHARACTERS, ENGLISH ALPHABETS, AND KOREAN CHARACTERS BY USING A NUMERICAL KEYBOARD

(76) Inventor: Chien-Hsing Lee, 235 Chung - Ho Box 8-24, Taipei (TW)

( * ) Notice: Subject to any disclaimer, the term of this patent is extended or adjusted under 35 U.S.C. 154(b) by 1380 days.

(21) Appl. No.: 11/183,021

(22) Filed: Jul. 18, 2005

(65) Prior Publication Data

US 2007/0016858 A1 Jan. 18, 2007

(51) Int. Cl.
*G06F 17/00* (2006.01)
(52) U.S. Cl. ............... 715/259; 715/261; 715/264; 715/265
(58) Field of Classification Search ......... 715/200, 715/255, 256, 259, 261, 264, 265
See application file for complete search history.

(56) References Cited

U.S. PATENT DOCUMENTS

| 6,801,659 B1* | 10/2004 | O'Dell | 382/185 |
| 6,837,633 B2* | 1/2005 | Lorenzo | 400/100 |
| 7,508,380 B2* | 3/2009 | Chung | 345/171 |
| 2002/0045463 A1* | 4/2002 | Chen et al. | 455/566 |
| 2002/0180806 A1* | 12/2002 | Zhang et al. | 345/816 |
| 2002/0188437 A1* | 12/2002 | Chou | 704/2 |
| 2003/0040899 A1* | 2/2003 | Ogilvie | 704/2 |
| 2003/0190181 A1* | 10/2003 | Kim | 400/472 |
| 2003/0202832 A1* | 10/2003 | Lorenzo | 400/103 |
| 2005/0104869 A1* | 5/2005 | Chung | 345/179 |
| 2006/0248459 A1* | 11/2006 | Su | 715/703 |

* cited by examiner

*Primary Examiner*—Stephen S Hong
*Assistant Examiner*—Gregory J Vaughn

(57) ABSTRACT

A method for inputting Chinese characters, English alphabets, and Korean characters by using a numerical keyboard. The numerical keyboard includes a switching key set for switching the numerical keyboard to a respective software for presenting the Chinese characters, English alphabets and Korean characters. The Chinese characters, English alphabets, and Korean characters are distributed in the keys of the numerical keyboard. The Chinese character is inputted by clicking keys representing first stroke of a traditional recognized component of a Chinese character to be inputted and, a first and a last strokes of a non-traditional recognized component. The English alphabet and the Korean characters are inputted by keys representing vowels, consonants and epilogs thereof and if necessary, other keys for identifying the Chinese characters having same input way are inputted, and the # key and *key are used as auxiliary keys.

14 Claims, 18 Drawing Sheets

| | | | |
|---|---|---|---|
| ㄆ:ㄆ | ㄐ:ㄐ、a | ㄚ:ㄚ、e | ㄤ:ㄤ、f |
| ㄆ:b | ㄐ:b、a | ㄚ:b、e | ㄤ:b、f |
| ㄆ:1 | ㄐ:1、0 | ㄚ:1、4 | ㄤ:1、5 | a

| | | | |
|---|---|---|---|
| ㄅ:a | ㄏ:a、b | ㄙ:a、c | ㄣ:a、d |
| ㄆ:b | ㄐ:b、a | ㄚ:b、e | |
| ㄇ:c | ㄑ:c、a | ㄛ:c、b | ㄥ:c、e |
| ㄈ:d | ㄒ:d、a | ㄜ:d、c | ㄦ:d、f |
| ㄉ:e | ㄓ:e、b | ㄝ:e、h | 一:e、i |
| ㄊ:f | ㄔ:f、c | ㄞ:f、b | ㄨ:f、e |
| ㄋ:g | ㄕ:g、d | ㄟ:g、c | ㄩ:g、f |
| ㄌ:h | ㄖ:h、e | ㄠ:h、i | |
| ㄍ:i | ㄗ:i、f | ㄡ:i、e | |
| ㄎ:j | ㄘ:j、g | ㄢ:j、f | | b

WORD:wc.ob.rb .da

WORD:#w. * o. *r . d

| | | |
|---|---|---|
| 0~a:ㅇ | 9~j:ㅎ | 1.7~b.h:ㄱㅅ |
| 1~b:ㄱ | 4.9~e.j:ㅀ | 5.7~f.h:ㅄ |
| 2~c:ㄴ | 4.6~e.g:ㄿ | *7~ *h:*ㅆ |
| 3~d:ㄷ | 4.4~e.e:ㄾ | 2.8~c.i:ㄵ |
| 4~e:ㄹ | * 2~ *c: *ㅋ | 2.9~c.j:ㄶ |
| 5~f:ㅂ | *4~ *e: *ㅌ | 4.1~e.b:ㄺ |
| 6~g:ㅍ | *0~ *a: *ㅁ | 4.5~e.f: ㄽ |
| 7~h:ㅅ | *9~ *j: *ㅊ | 4.7~e.h:ㄻ |
| 8~i:ㅈ | 1~b: *ㄲ | 4.0~e.a:ㄻ |

Fig. 16

| | ㅣ | ㅡ | ㅏ A | ㅓ | ㅑ | ㅕ | ㅗ | ㅜ | ㅛ | ㅠ |
|---|---|---|---|---|---|---|---|---|---|---|
| | 1 | 2 | 3 13 | 4 | 5 | 6 | 7 | 8 | 9 | 0 |
| ㄱ B | 기 | 그 | 가 | 거 | 갸 | 겨 | 고 | 구 | 교 | 규 |
| 1 | 11 | 12 | 13 | 14 | 15 | 16 | 17 | 18 | 19 | 10 |
| ㄴ | 니 | 느 | 나 | 너 | 냐 | 녀 | 노 | 누 | 뇨 | 뉴 |
| 2 | 21 | 22 | 23 | 24 | 25 | 26 | 27 | 28 | 29 | 20 |
| ㄷ | 디 | 드 | 다 | 더 | 댜 | 뎌 | 도 | 두 | 됴 | 듀 |
| 3 | 31 | 32 | 33 | 34 | 35 | 36 | 37 | 38 | 39 | 30 |
| ㄹ | 리 | 르 | 라 | 러 | 랴 | 려 | 로 | 루 | 료 | 류 |
| 4 | 41 | 42 | 43 | 44 | 45 | 46 | 47 | 48 | 49 | 40 |
| ㅂ | 비 | 브 | 바 | 버 | 뱌 | 벼 | 보 | 부 | 뵤 | 뷰 |
| 5 | 51 | 52 | 53 | 54 | 55 | 56 | 57 | 58 | 59 | 50 |
| ㅍ | 피 | 프 | 파 | 퍼 | 퍄 | 펴 | 포 | 푸 | 표 | 퓨 |
| 6 | 61 | 62 | 63 | 64 | 65 | 66 | 67 | 68 | 69 | 60 |
| ㅅ | 시 | 스 | 사 | 서 | 샤 | 셔 | 소 | 수 | 쇼 | 슈 |
| 7 | 71 | 72 | 73 | 74 | 75 | 76 | 77 | 78 | 79 | 70 |
| ㅈ | 지 | 즈 | 자 | 저 | 쟈 | 져 | 조 | 주 | 죠 | 쥬 |
| 8 | 81 | 82 | 83 | 84 | 85 | 86 | 87 | 88 | 89 | 80 |
| ㅎ | 히 | 흐 | 하 | 허 | 햐 | 혀 | 호 | 후 | 효 | 휴 |
| 9 | 91 | 92 | 93 | 94 | 95 | 96 | 97 | 98 | 99 | 90 |
| ㅇ | 이 | 으 | 아 | 어 | 야 | 여 | 오 | 우 | 요 | 유 |
| 0 | 01 | 02 | 03 | 04 | 05 | 06 | 07 | 08 | 09 | 00 |
| ㅊ | 치 | 츠 | 차 | 처 | 챠 | 쳐 | 초 | 추 | 쵸 | 츄 |
| *9 | *91 | *92 | *93 | *94 | *95 | *96 | *97 | *98 | *99 | *90 |
| ㅋ | 키 | 크 | 카 | 커 | 캬 | 켜 | 코 | 쿠 | 쿄 | 큐 |
| *2 | *21 | *22 | *23 | *24 | *25 | *26 | *27 | *28 | *29 | *20 |
| ㅌ | 티 | 트 | 타 | 터 | 탸 | 텨 | 토 | 투 | 툐 | 튜 |
| *4 | *41 | *42 | *43 | *44 | *45 | *46 | *47 | *48 | *49 | *40 |
| ㅁ | 미 | 므 | 마 | 머 | 먀 | 며 | 모 | 무 | 묘 | 뮤 |
| *0 | *01 | *02 | *03 | *04 | *05 | *06 | *07 | *08 | *09 | *00 |

Fig. 17

| ㄷㄱ | ㄱ | ㄴ | ㄷ | ㄹ | ㅁ | ㅂ | ㅇ |
|---|---|---|---|---|---|---|---|
| 131 | 1 | 2 | 3 | 4 | *0 | 5 | 0 |
| 가 | 각 | 간 | 갇 | 갈 | 감 | 갑 | 강 |
| 13 | 131 | 132 | 133 | 134 | 13*0 | 135 | 130 |
| 나 | 낙 | 난 | 낟 | 날 | 남 | 납 | 낭 |
| 23 | 231 | 232 | 233 | 234 | 23*0 | 235 | 230 |
| 다 | 닥 | 단 | 닫 | 달 | 담 | 답 | 당 |
| 33 | 331 | 332 | 333 | 334 | 33*0 | 335 | 330 |
| 라 | 락 | 란 | 랃 | 랄 | 람 | 랍 | 랑 |
| 43 | 431 | 432 | 433 | 434 | 43*0 | 435 | 430 |
| 바 | 박 | 반 | 받 | 발 | 밤 | 밥 | 방 |
| 53 | 531 | 532 | 533 | 534 | 53*0 | 535 | 530 |
| 파 | 팍 | 판 | 팓 | 팔 | 팜 | 팝 | 팡 |
| 63 | 631 | 632 | 633 | 634 | 63*0 | 635 | 630 |
| 사 | 삭 | 산 | 삳 | 살 | 삼 | 삽 | 상 |
| 73 | 731 | 732 | 733 | 734 | 73*0 | 735 | 730 |
| 자 | 작 | 잔 | 잗 | 잘 | 잠 | 잡 | 장 |
| 83 | 831 | 832 | 833 | 834 | 83*0 | 835 | 830 |
| 하 | 학 | 한 | 핟 | 할 | 함 | 합 | 항 |
| 93 | 931 | 932 | 933 | 934 | 93*0 | 935 | 930 |
| 아 | 악 | 안 | 앋 | 알 | 암 | 압 | 앙 |
| 03 | 031 | 032 | 033 | 034 | 03*0 | 035 | 030 |
| 차 | 착 | 찬 | 찯 | 찰 | 참 | 찹 | 창 |
| *93 | *931 | *932 | *933 | *934 | *93*0 | *935 | *930 |
| 카 | 칵 | 칸 | 칻 | 칼 | 캄 | 캅 | 캉 |
| *23 | *231 | *232 | *233 | *234 | *23*0 | *235 | *230 |
| 타 | 탁 | 탄 | 탇 | 탈 | 탐 | 탑 | 탕 |
| *43 | *431 | *432 | *433 | *434 | *43*0 | *435 | *430 |
| 마 | 막 | 만 | 맏 | 말 | 맘 | 맙 | 망 |
| *03 | *031 | *032 | *033 | *034 | *03*0 | *035 | *030 |

Fig. 18

//METHOD FOR INPUTTING CHINESE CHARACTERS, ENGLISH ALPHABETS, AND KOREAN CHARACTERS BY USING A NUMERICAL KEYBOARD

FIELD OF THE INVENTION

The present invention relates to a method for inputting Chinese characters, English alphabets, and Korean characters by using a numerical keyboard. The Chinese characters, English alphabets, and Korean characters are distributed in the keys of the numerical keyboard. The Chinese character is inputted by clicking keys representing first stroke of a traditional recognized component of a Chinese character to be inputted and, a first and a last strokes of a non-traditional recognized component. The English alphabet and the Korean characters are inputted by keys representing vowels, consonants and epilogs thereof and if necessary, other keys for identifying the Chinese characters having same input way is inputted, and the # key and *key are used as auxiliary keys.

BACKGROUND OF THE INVENTION

Currently, the ways for inputting Chinese characters include various ways based on the pronunciations of the Chinese characters and various ways based on the shapes of the characters. The former ways can be learnt easily and thus the users can use these ways to input Chinese characters with a quick learning process. However these ways need clicking more keys for inputting a character and moreover there are many words which have the same pronunciation so that the users must select a desired one. This makes a trouble to the user, and in particular to the beginners. The ways based on the shapes of the Chinese characters mainly depend on the decomposition of the characters, but this is very difficult in learning. It cannot be widely accepted.

Furthermore, the above mentioned ways need many keys so that a greater space is necessary. Thereby the operation must be performed by two hands. If the inputting device is installed to a small type electronic device, this is especially inconvenient. For example for hand sets, automatic teller machines, etc., the user must operate the device with one hand taking some objects.

In U.S. Pat. No. 6,094,666, "Chinese character input scheme having ten symbol groupings of Chinese characters in a recumbent or upright configuration", a way for resolving above problems is disclosed. However this method requests the users to keep 10 symbol groupings in mind and the numbers of 98 traditional recognized components in Chinese characters and the relations for inputting. It is very complicated and tedious and cannot be achieved in the short learning period.

SUMMARY OF THE INVENTION

Accordingly, the primary object of the present invention is to provide a method for inputting Chinese characters, English alphabets, and Korean characters by using a numerical keyboard. The numerical keyboard includes a switching key set for switching the numerical keyboard to a respective software for presenting the Chinese characters, English alphabets and Korean characters. The Chinese characters, English alphabets, and Korean characters are distributed in the keys of the numerical keyboard. The Chinese character is inputted by clicking keys representing first stroke of a traditional recognized component of a Chinese character to be inputted and, a first and a last strokes of a non-traditional recognized component. The English alphabet and the Korean characters are inputted by keys representing vowels, consonants and epilogs thereof and if necessary, other keys for identifying the Chinese characters having same input way is inputted, and the # key and *key are used as auxiliary keys. Korean characters is inputted based on basic vowels, consonants and epilogs.

In the present invention, for Chinese characters, the keys and representing strokes and the subsidiary strokes dependent to the representing strokes are illustrated in the following, that is the subsidiary strokes are represented by the related represented strokes wherein the representing strokes and the subsidiary strokes are inputted by clicking the keys at the first column, the Chinese character is inputted by clicking keys representing first stroke of a traditional recognized component of a Chinese character to be inputted and, a first and a last strokes of a non-traditional recognized component of the Chinese character; and if the Chinese character has no non-traditional recognized component, the first stroke and a last stroke of the Chinese character is used.

English characters are arranged on the numerical keyboard firstly; each key represent some English alphabets; and one English alphabet is inputted by directly clicking the key, and the other English alphabet are inputted by pressing the key and then an auxiliary key.

In the input of Korean characters; the base phonetics being used; the Korean characters being divided into basic vowels, consonants and epilogs which are arranged on the numerical keyboard; other then the numerical keys 0 to 9, the keys of * and # are used for the basic vowels and consonants so as to prevent the unnecessary repeat; the switch key being used for switching the inputs of Chinese characters, English alphabets and Korean characters.

The various objects and advantages of the present invention will be more readily understood from the following detailed description when read in conjunction with the appended drawing.

BRIEF DESCRIPTION OF THE DRAWINGS

FIG. 2 illustrates the Chinese character input according to the present invention, wherein the strokes, English alphabets and orders of the keys are used.

FIG. 3 illustrates the Chinese character input according to the present invention, wherein the strokes, English alphabets and orders of the keys are used.

FIG. 4 shows the sets of the strokes of the Chinese characters according to the present invention.

FIG. 6 shows six examples of the inputting of Chinese characters according to the embodiment of the present invention.

FIG. 7 shows table illustrating the input ways of the Chinese characters according to the third and fourth embodiments of the present invention.

FIG. 8 shows table illustrating the input ways of the Chinese characters according to the fifth embodiments of the present invention.

FIG. 11 is a schematic view about a table of the first embodiment about the English alphabet input according to the present invention.

FIG. 12 is a schematic view about a table of the second embodiment about the English alphabet input according to the present invention.

FIG. 14 shows the relation of the inputting keys and the basic vowels and other vowels in the Korean characters according to the method of the present invention.

FIG. 15 shows the relation of the inputting keys and the basic consonants and other consonants in the Korean characters according to the method of the present invention.

FIG. 16 shows the relation of the inputting keys and the epilogs in the Korean characters according to the method of the present invention.

FIG. 17 is a table showing the relation of the vowels and consonants in the Korean characters and the input keys are illustrated. It is illustrated that no repeat occurs.

FIG. 18 is a table showing the relation of the vowels, consonants, and epilogs in the Korean character with respect to the input keys are illustrated. No repeat is found.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
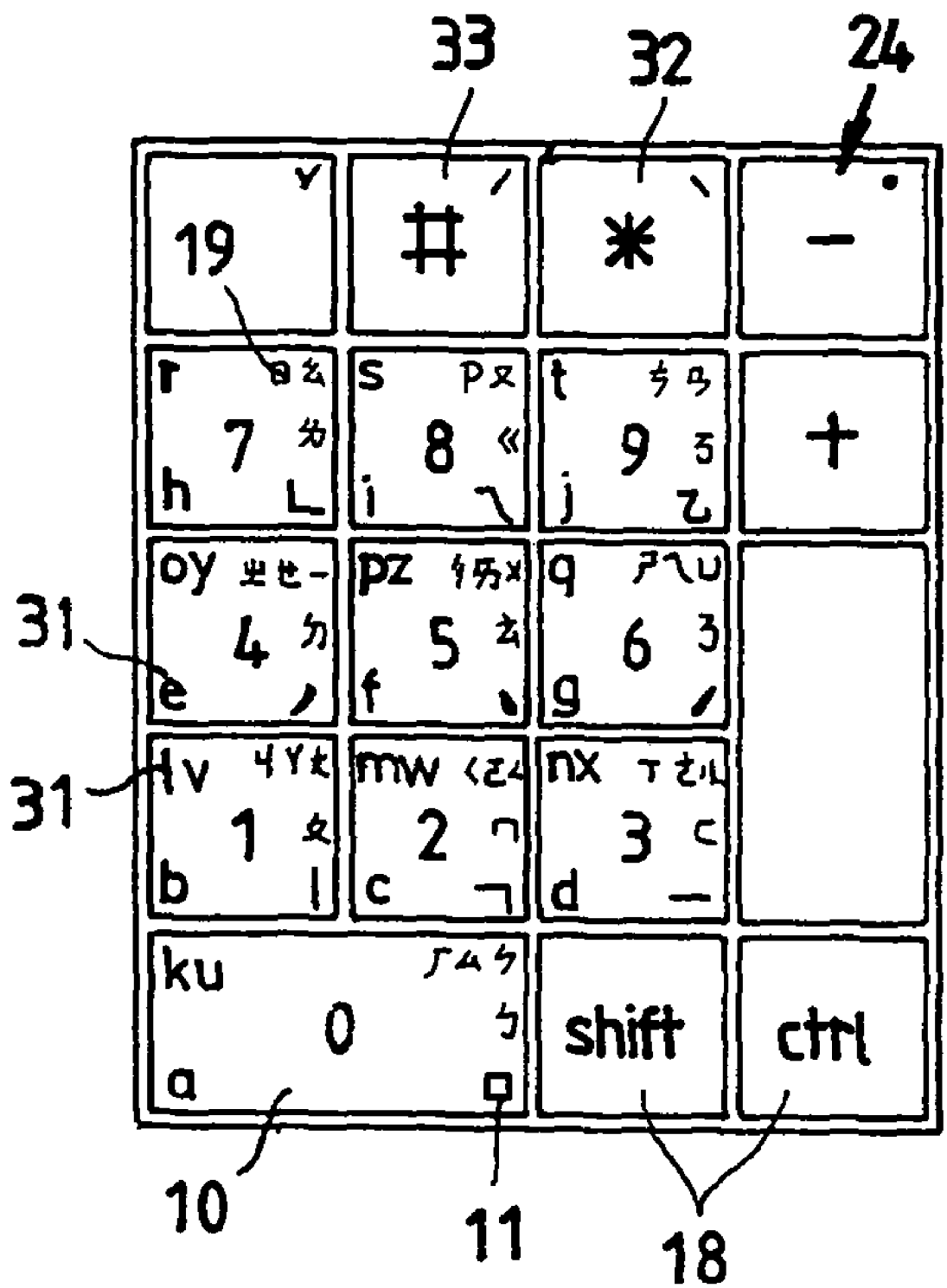
FIG. 1 is a schematic view about the numerical keyboards used in the present invention, wherein the arrangement of all the characters is illustrated including 37 phonetic symbols used in Chinese characters and 26 English alphabets.

In the following, we will firstly discuss about the data input of Chinese characters. The variations of the strokes of Chinese characters. Referring to FIG. 1, a numerical keyboard is illustrated. The numerical keyboard has the keys for inputting numbers and mathematic operations. In the prior art, the numerical keyboard is a small keyboard arranged as a rectangular shape, such as those illustrated in general keyboards, or those in keypads of a handsets. The present invention uses the numerical keyboard as an input tool.

Referring to FIG. 2, all the strokes of the Chinese characters can be divided into 10 groups, namely, group

| Keys | Representing stroke | subsidiary strokes |
| --- | --- | --- |
| 0~a | 口 | |
| 1~b | 丨 | 丨、丶 |
| 2~c | フ | フ、フ、フ、ク |
| 3~d | 一 | 3、7 |
| 4~e | ノ | 丶、ノ、丨、ノ |
| 5~f | 丶 | 丶、丶、丶 |
| 6~g | ノ | ノ |
| 7~h | L | L、く、乚 |
| 8~i | 乀 | 乀、乀 |
| 9~j | 乛 | 乚 |

The related strokes are illustrated in FIG. 2. Other strokes not including in above 20 groups can be added to similar groups. If the word is a traditional recognized component, then the first stroke and last stroke are selected.

For example, the word "ㄱ"13 can be added to 9-j set. Moreover the "亠"14, "丷"15, and "ㅏ"16 can be added to the 9~j set.

Referring to FIGS. 4 and 5b, in another embodiment, A, B, C, and D sets are added to the original sets.

A: 亠、丷、ㄅ

B: ㄥ、ㅏ

C: ㄱ

D: 3、ㄱ

Figure 5:
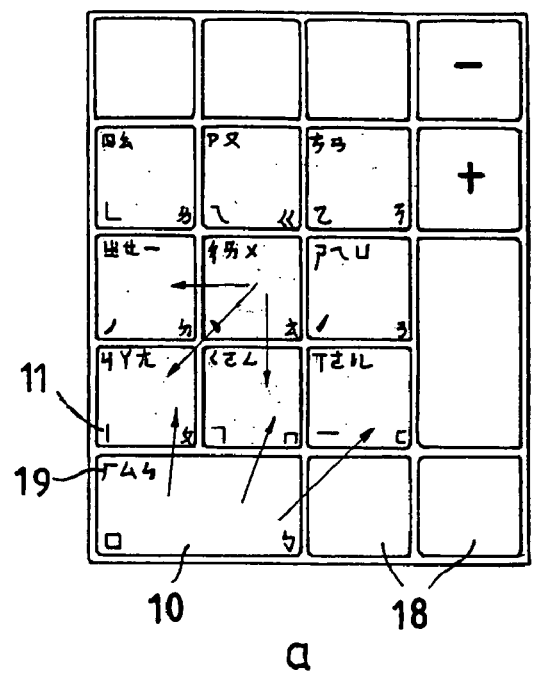
FIGS. 5a and 5b show the arrangements of the Chinese characters on the numerical keyboard according to the present invention.
Figure 5:
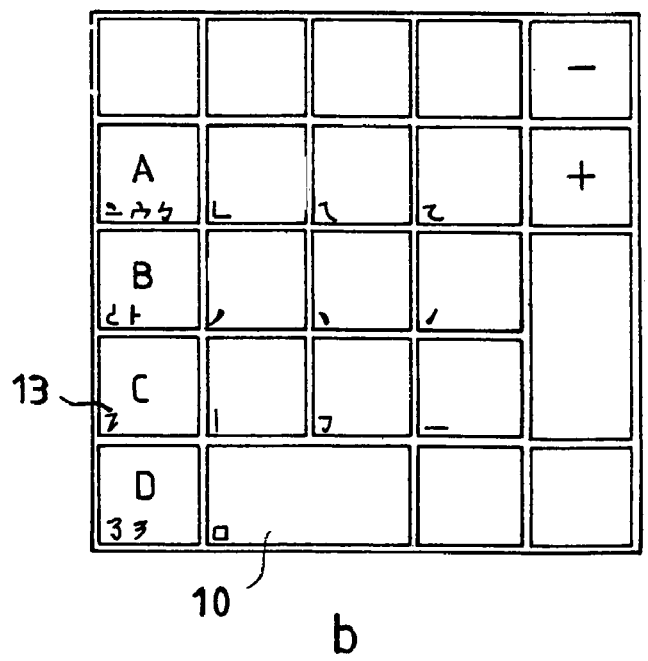

FIG. 5 shows the position of the A, B, C and D sets in the numerical keyboard.

Referring to FIG. 5, a switching key 18 is illustrated for switching the operation into Chinese characters, English characters, and Korean characters.

Each Chinese character includes at least one of traditional recognized components and a part of non-traditional recognized components. The first stroke of the traditional recognized component and the first and last strokes of the non-traditional recognized component are used in input of Chinese characters. There are two orders used in the Chinese character input. In first kind, the first stroke of the traditional recognized component is input firstly, then the first stroke of the non-traditional recognized component, and then the last stroke of the non-traditional recognized component are inputted.

Referring to FIG. 6a, a Chinese character of "電"is illustrated. The traditional recognized component of the word is "雨". A stroke 3 of "一"is got. Next, for the non-traditional recognized component, a stroke 0 of "囗".is got and then a stroke 7 of "L"is got as a last input. Thereby the strokes of "L"and "一", "囗"are inputted sequentially. The corresponding keys are d, a, h or 3, 0 and 7. In another input example, see FIG. 6b, for a Chinese character of "我",with a recognized component of "戈"and a non-traditional recognized component of "扌", the order for input is "一"、"ノ"and "✓",The corresponding keys are d, e, g or 3, 4 and 6.

In any embodiment, the order for input Chinese characters is based on the writing order of the Chinese character. For example in above example, for the word "電",the order for input is "一", "囗"and "L"which are identical to the above one. This is because the traditional recognized component is written firstly, but for the word "我",the input order is "一"、"ノ"and "✓",which is different from the above one. Referring to FIG. 6d, a Chinese character "愛"is used as an example. The traditional recognized component is "心"which is located at a middle portion. Thereby in this embodiment, the non-traditional recognized component is used firstly. Thereby the stroke 4 "ノ"is used, then the first stroke of the traditional recognized component is got, which is stroke 5 of " 丶 "and then the last stroke of the non-traditional recognized component is got, which is the stroke 8 of "乀"-Referring to FIG. 6e, a Chinese character of "傘"is used as an example. In FIG. 6f, a Chinese character of "車"is used as an example. This word is formed by a traditional recognized component "車"The stroke of the word is a stroke 3 of "一"and the last stroke of the word is a stroke 1 of "丨"Thereby the operation keys are d and b.

In above method, there are some words which have the same first stroke and last stroke, such as the words "口", "國", "田", "固"... In this example, the last stroke is dependent to the first stroke. Thereby the input key for the word of "國" is a, d and f. The input key for the word of "田" is a, and b. The input key for the word of "固" is a, d and a. Thereby there are identified. Thereby the stroke 11 of the word "口" is input by the whole shape. The words of "皿", "用", "母" etc. have their strokes 11 instead of the word "口".

Referring to FIGS. 7 and 8, the third, fourth and fifth embodiments about the input method of Chinese characters of the present invention is illustrated.

In the third embodiment, the first and last strokes of the words, the first phonetic symbol of the word are used. For example for the word "我", the first stroke "丿" and last stroke "丶" and the first phonetic symbol "ㄨ" are used. In this embodiment, the 37 phonetic symbols used in the Chinese characters must be distributed on the numerical keyboard. For example, referring to FIG. 1, the phonetic symbols ㄅ, ㄈ, ㄌ, ㄏ are arranged in the key of 0, etc., as illustrated in FIG. 1.

In the fourth embodiment, as shown in FIGS. 7a and 7b, for the phonetic symbols in the same key, one predetermined phonetic symbol is inputted by only pressing the key, but the other phonetic symbols are inputted by pressing the key and a further key. For example, for the ㄅ, ㄈ, ㄌ, ㄏ arranged in the key of 0, if only the key 0 is pressed, it represents that the phonetic symbol ㄅ is inputted. If the key 0 and key 1 are pressed sequentially, it represents that the phonetic symbol ㄈ is inputted. If the key 0 and key 2 are pressed sequentially, it represents that the phonetic symbol ㄌ is inputted. If the key 0 and key 3 are pressed sequentially, it represents that the phonetic symbol ㄏ is inputted.

In the fifth example, see FIG. 5a, in the key 5, there are four phonetic symbols are arranged therein, which are ㄎ, ㄑ, ㄞ, ㄨ. The ㄎ is arranged independent. Thus if key 5 is pressed, it represents an input of the ㄎ. The ㄑ is assigned with key 5 and key 2. The ㄞ is assigned with key 5 and key 1. The ㄨ is assigned with key 5 and key 4. See FIG. 8b, it is illustrated that no repeated state occurs. Since in Chinese characters, there are 37 phonetic symbols, in the three embodiments, it is very few for the Chinese characters having same input keys.

In above method, if the traditional recognized component or non-traditional recognized component has only one stroke, then the stroke is used as an input and no other input is used. For example for the traditional recognized component "丨" in the words "甲", "申", "由", the stroke "丨" is used as input. If same traditional recognized components are occurred in one word, then only one is used in keying. For example the Chinese characters "森", "焱", "參", "品" etc.

Furthermore, in the present invention, the input keys for all the Chinese characters can be registered to a dictionary which can be checked by users so that when the user do not determine the input keys, the user can check the dictionary immediately. This is specifically preferred to the initial users. For example, the Chinese character of "電" in 6a, can be related to the keys of "一", "口" and "乚" d, a, h and 3, 0 and 7.

Figure 9:
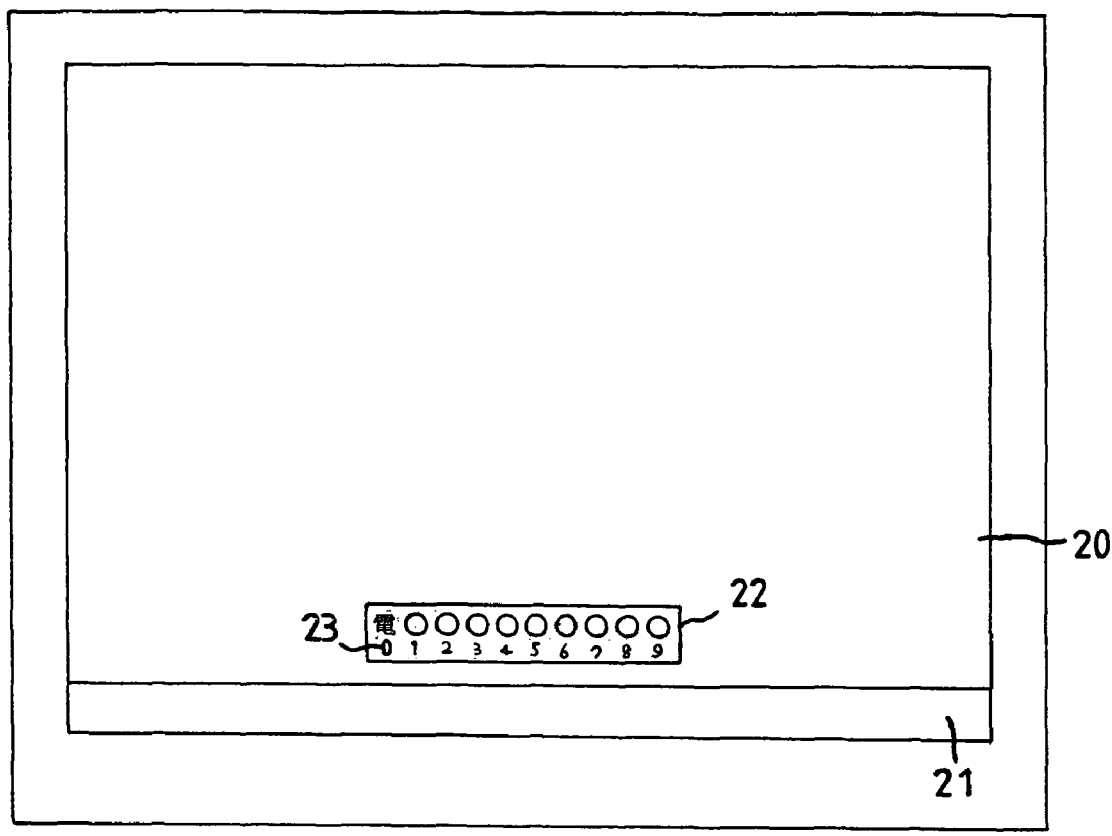
FIG. 9 shows the first way for processing the Chinese characters with same input keys according to the present invention.
Figure 9:
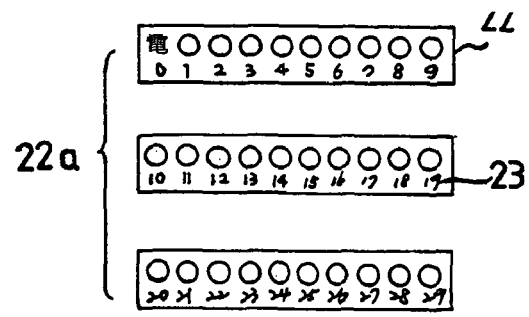

For the Chinese characters having same input keys, all these Chinese characters are displayed to be selected by users, as shown in FIG. 9A. However this method will make the input time being longer.

To improve above mentioned problem, in the first way, the Chinese characters having same input keys are divided into three sets, as shown in FIG. 9b, according to the order of traditional recognized components. The order is that the traditional recognized components with fewer strokes are arranged firstly and then the Chinese characters with more strokes are arranged next.

In the second way, for the Chinese characters with the same input keys, the phonetic symbols are emitted by the computer, the user can input the key representing the phonetic symbols (in the first and second embodiments), or all the numbers of the traditional recognized components in the Chinese characters are inputted. If there is still Chinese characters with the same input keys, the second strokes, third strokes, fourth strokes, etc., of the traditional recognized components in these Chinese characters are inputted. Referring to FIG. 6d, for the word "愛" with a traditional recognized component "心" has the input keys of "丿", "丶" and "乀". If there is words repeated. The number of the strokes of the traditional recognized component is inputted. For example the traditional recognized component is "心" which is four strokes. Thus the key of 4 is pressed. If under this condition, there is still several words with the same input way, then the second stroke "丶" of the traditional recognized component is pressed. If under this condition, there is still several words with the same input way, the second stroke "ㄋ" is pressed. The process is repeated. If the number of the strokes are two digitals, then two keys are pressed. For example if the traditional recognized component has 12 strokes, the keys of 1 and 2 are pressed.

Referring to FIG. 1, the keys of "19", "#", "*" and "−" are used to represent the tones of the sounds of the Chinese characters.

In the present invention, the strokes are arranged in different keys, which are arranged based on the similarity of shapes of the strokes with the keys (0 to 9, and a to j). For example the key 0 represents the stroke of "丨", "丨", "丿". Thereby the user can memorize the keys easily.

In the present invention, only ten keys are to input all Chinese characters. Thereby it is specifically suitable for the handsets, automatic teller machines, and other small size electronic device. This is the advantages of the present invention over the prior art ways.

Figure 10:
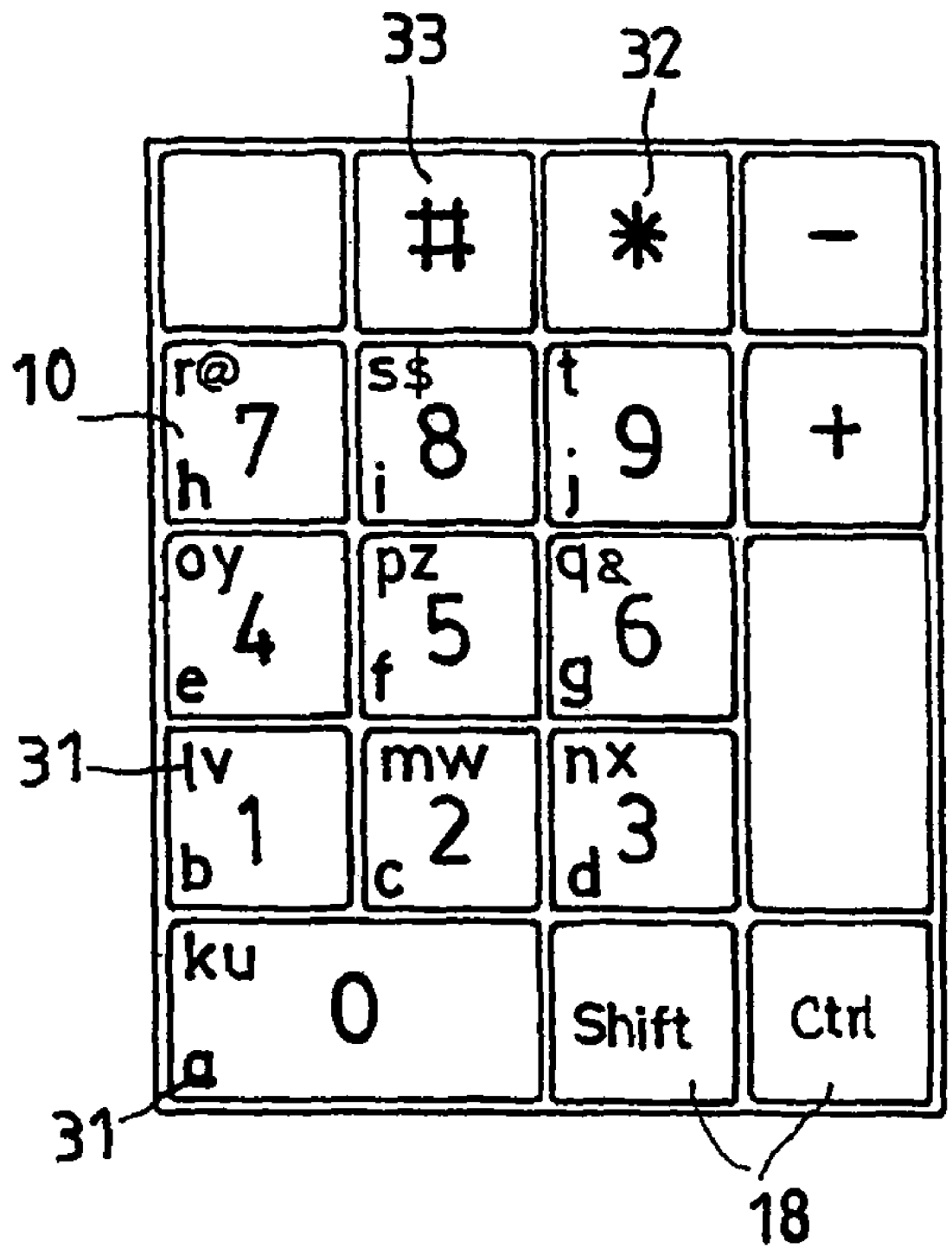
FIG. 10 shows the second way for processing the Chinese characters with same input keys according to the present invention, where these Chinese characters are sub-divided into a plurality of sub-sets.

The way for inputting English characters are illustrated in FIG. 10. In FIG. 10, the English characters are arranged on the numerical keyboard firstly. Each key represents some English alphabets. Each English alphabet is inputted by pressing the key representing the English alphabet and a further key which is for example keys a, b and c. For example English alphabets a, k, and u are in the key 0. Then the English alphabet is inputted by pressing keys 1 and key a. The English alphabet is inputted by pressing keys 0 and b. The English alphabet is inputted by pressing keys 0 and c. Referring to FIG. 11, the English alphabets are divided into three sets. The first set A is added with key a as a second input key. The second set B is added with key b as a second input key. The third set C is added with key c as a third input key.

Referring to FIG. 12, the second way for inputting English alphabets is illustrated. There are three sets being illustrated. In first set, the English alphabet from a, b, c to j is inputted by pressing the key representing the English alphabet. Such as English alphabet is inputted by pressing the key "a". For the English alphabets from k to t are inputted by firstly pressing a key "*" and then pressing the key representing the English alphabet. Such as the English alphabet is inputted by pressing the key "*" and the key 1. For English characters in the third set from q to z and &, # and $ are inputted by pressing firstly the # key and the key representing the word.

In the present invention, only one hand is necessary in operation and the operation speed can be increased. For example for the 26 English alphabets, it is only 26 seconds for inputting these English alphabets. However In the conventional way, 37 seconds are necessary to complete the operation.

In the following, the way for inputting Korean characters isllustrated. The base phonetics are used. The Korean characters are divided into basic vowels A, consonants B and epilogs C which are arranged on the numerical keyboard, as shown in FIGS. 13a and 13b. Other then the numerical keys 0 to 9, the keys of * and # are used for the basic vowels A and consonants B so as to prevent the unnecessary repeat. The switch key 18 is used for switching the inputs of Chinese characters, English alphabets and Korean characters.

Figure 13:
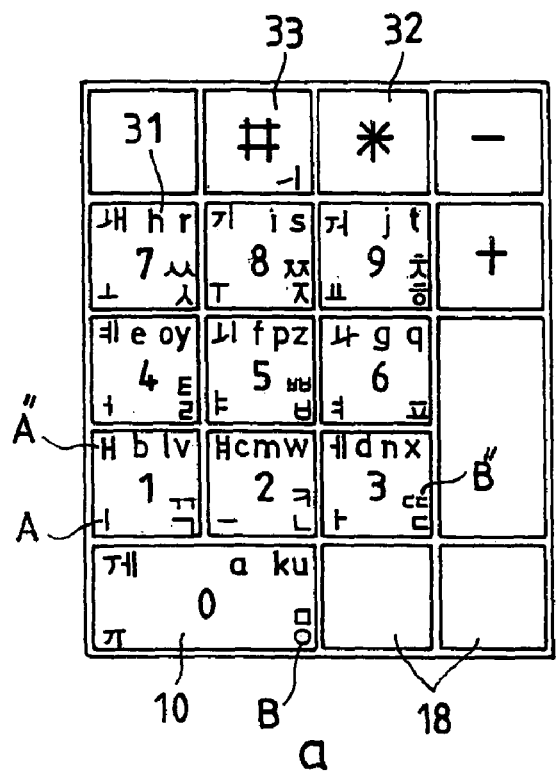
FIG. 13 shows the arrangement of the Korean characters according to the method of the present invention, where the keys # and *, and English alphabets are used auxiliary tools.
Figure 13:
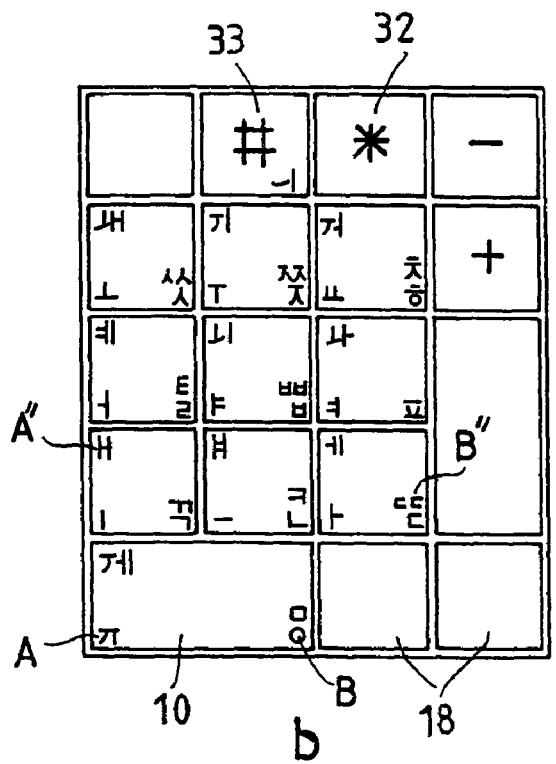

In operation, as illustrated in FIGS. 13 and 14, the basic vowels A and other vowels A are arranged on the numerical keyboard one by one.

In that:

Key 0: ㅠ · ㅞ

Key 1: ㅣ · ㅐ

Key 2: ─ · ㅒ

Key 3: ㅏ · ㅔ

Key 4: ㅓ · ㅖ

Key 5: ㅏ · ㅚ

Key 6: ㅓ · ㅝ

Key 7: ㅗ · ㅙ

Key 8: ㅜ · ㅟ

Key 9: ㅗ · ㅟ

Key #: ㅢ

In inputting the other vowels A, a * key is inputted.

In FIGS. 13 and 15 shows the arrangement of basic consonants B and other consonants B on the numerical keyboard.

The arrangement of the basic consonants B are:

Key 0: ㅇ · ㅁ

Key 1: ㄱ

Key 2: ㄴ · ㅋ

Key 3: ㄷ

Key 4: ㄹ · ㅌ

Key 5: ㅂ

Key 6: ㅍ

Key 7: ㅅ · ㅆ

Key 8: ㅈ

Key 9: ㅎ · ㅊ

For other consonants B

Key 1: ㄲ

Key 3: ㄸ

Key 5: ㅃ

Key 7: ㅆ

Key 8: ㅉ

The keys 0, 2, 4, and 9 representing the basic consonants and keys 1, 3, 5, 7 and 8 representing other consonants must be added with a * key (key 32) in advance.

FIG. 16 shows the representation of the keys for epilogs C. For those identical the consonants, the epilogs have the same input way as the consonants. For those epilogs formed by assembly to two phonemes, two keys representing the phonemes are pressed. Thereby the inputting of the following keys sequentially represent the input the epilogs list after the keys.

Key 4 (first clicking) and key 9 (second clicking): ㄹㅎ

Key 4 (first clicking) and key 6 (second clicking): ㄹㅍ

Key 4 (first clicking) and key 4 (second clicking): ㄹㅌ

Key 1 (first clicking) and key 7 (second clicking): ㄱㅅ

Key 5 (first clicking) and key 7 (second clicking): ㅂㅅ

Key 2 (first clicking) and key 8 (second clicking): ㄴㅈ

Key 2 (first clicking) and key 9 (second clicking): ㄴㅎ

Key 4 (first clicking) and key 1 (second clicking): ㄹㄱ

Key 4 (first clicking) and key 5 (second clicking): ㄹㅂ

Key 4 (first clicking) and key 7 (second clicking): ㄹㅅ

Key 4 (first clicking) and key 0 (second clicking): ㄹㅁ

Originally, Key 4 (first), key * (second) and key 4 (third clicking) is "ㄹㅌ"and Key 4 (first), key * (second) and key 0 (third clicking) is "ㄹㅁ", but because no confusion will occur and thus the * key is omitted.

Referring to FIG. 17, a table showing the relation of the vowels and consonants in the Korean characters and the input keys are illustrated. It is illustrated that no repeat occurs. Referring to FIG. 18, a table showing the relations of the vowels, consonants, and epilogs in the Korean character with respect to the input keys are illustrated. No repeat is found.

Referring to FIG. 13, it is illustrated that the keys are common to the vowels, A consonants B and epilogs C, but the keys * and # are used to divide these phonemes. Furthermore, in writing of the Korean characters, the consonants B, vowels A and epilogs C are written sequentially and thus no confusion occurs. Thus no repeat occurs. Furthermore, if the keys are not indicated with the respective Korean characters, as shown in FIGS. 13a and 13b. The users must keep the relation in mind, however this is easy.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for inputting Chinese characters, English alphabets, and Korean characters by using a numerical keyboard, wherein the numerical keyboard includes a switching key set for switching the numerical keyboard to a respect software for presenting Chinese characters, English alphabets and Korean characters by clicking keys on the numerical keyboard; wherein the Chinese characters, English alphabets, and Korean characters are distributed in the keys of the numerical keyboard; wherein:

the Chinese character is inputted by clicking keys representing first stroke of a traditional recognized component of a Chinese character to be inputted and, a first and a last strokes of a non-traditional recognized component of the Chinese character; and if necessary, other keys for identifying the Chinese characters having same input way is inputted;

the English alphabet and the Korean characters are inputted by keys representing vowels, consonants and epilogs thereof and if necessary, other keys for identifying the Chinese characters having same input way is inputted, and the #key and * key are used as auxiliary keys; and wherein a first and a last strokes of a Chinese character is used as an input, and then a first phonetic symbol is used as an input, wherein all the phonetic symbols are arranged on the numerical keyboard, in inputting of the phonetic symbols, the former phonetic symbols are directly inputted by clicking the keys the other phonetic symbols are inputted by pressing the key and then an auxiliary key; the arrange of the Chinese characters are:

key 0. ㄅ、ㄆ、ㄇ、ㄈ
key 1. ㄉ、ㄋ、ㄚ、ㄜ
key 2. ㄍ、ㄑ、ㄛ、ㄥ
key 3. ㄈ、ㄒ、ㄤ、ㄦ
key 4. ㄉ、ㄓ、ㄝ、ㄧ
key 5. ㄊ、ㄔ、ㄞ、ㄨ
key 6. ㄋ、ㄕ、ㄟ、ㄩ
key 7. ㄌ、ㄖ、ㄠ
key 8. ㄍ、ㄗ、ㄡ
key 9. ㄎ、ㄘ、ㄢ thus, the first phonetic symbols of each key is inputted by directly inputting the key, while other phonetic symbols are inputted by an auxiliary key; the auxiliary key is selected from one of a first set of key a, key b, and key c, and a second set formed by key 1, key 2, and key 3 and a third set formed by keys below the phonetic symbol to be inputted with an order from the left to the right.

2. The method as claimed in claim 1, wherein in the input of Korean characters; the base phonetics are used; the Korean characters are divided into basic vowels, consonants and epilogs which are arranged on the numerical keyboard; other then the numerical keys 0 to 9, the keys of * and # are used for the basic vowels and consonants so as to prevent the unnecessary repeat; the switch key are used for switching the inputs of Chinese characters, English alphabets and Korean characters;

wherein the basic vowels and other basic vowels are arranged on the numerical keyboard one by one;

In that:

Key 0. ㅠ、ㅖ
Key 1. ㅣ、ㅒ
Key 2. ㅡ、ㅐ
Key 3. ㅏ、ㅔ
Key 4. ㅓ、ㅖ
Key 5. ㅑ、ㅛ
Key 6. ㅕ、ㅠ
Key 7. ㅗ、ㅙ
Key 8. ㅜ、ㅝ
Key 9. ㅛ、ㅟ
Key #: ㅢ in inputting the other vowels A, a * key is inputted in advance;

wherein the arrangement of the basic consonants B are:

Key 0. ㅇ、ㅁ
Key 1. ㄱ
Key 2. ㄴ、ㅋ
Key 3. ㄷ
Key 4. ㄹ、ㅌ
Key 5. ㅂ
Key 6. ㅍ
Key 7. ㅅ、ㅆ

Key 8. ㅈ
Key 9. ㅎ、ㅊ
Key #:
for other consonants B
Key 1. ㄲ
Key 3. ㄸ
Key 5. ㅃ
Key 7. ㅆ
Key 8. ㅉ the keys 0, 2, 4, 6 and 9 representing the basic consonants and keys 1, 3, 5, 7 and 8 representing other consonants must be added with a * key in advance;

wherein for those identical the consonants, the epilogs have the same input way as the consonants; for those epilogs formed by assembly to two phonemes, two keys representing the phonemes are pressed; thereby the inputting of the following keys sequentially represent the input the epilogs list after the keys:

Key 4 (First clicking) and key 9 (second clicking): ㄹㅎ
Key 4 (First clicking) and key 6 (second clicking): ㄹㅍ
Key 4 (First clicking) and key 4 (second clicking): ㄹㅌ
Key 1 (First clicking) and key 7 (second clicking): ㄱㅅ
Key 5 (First clicking) and key 7 (second clicking): ㅂㅅ
Key 2 (First clicking) and key 8 (second clicking): ㄴㅈ
Key 2 (First clicking) and key 9 (second clicking): ㄴㅎ
Key 4 (First clicking) and key 1 (second clicking): ㄹㄱ
Key 4 (First clicking) and key 5 (second clicking): ㄹㅂ
Key 4 (First clicking) and key 7 (second clicking): ㄹㅅ
Key 4 (First clicking) and key 0 (second clicking): ㄹㅇ originally, Key 4 (first), key * (second) and key 4 (third clicking) is "ㄹㅌ" and Key 4 (first) key * (second) and key 0 (third clicking) is "ㄹㅁ", but because no confusion will occur and thus the * key is omitted.

3. The method of claim 1, wherein 37 phonetic symbol and the phonetic symbols of the Chinese characters are arranged on the numerical keyboard.

4. A method for inputting Chinese characters, English alphabets, and Korean characters by using a numerical keyboard, wherein for Chinese characters, the keys and representing strokes and the subsidiary strokes dependent to the representing strokes are illustrated in the following, that is the subsidiary strokes are represented by the related represented strokes:

| Keys | Representing stroke | subsidiary strokes |
| --- | --- | --- |
| 0~a | ㄩ | |
| 1~b | ∣ | ∣.∣.丶 |
| 2~c | ㄱ | ㄱ.ㄱ.ㄱ.ㄱ.ㄣ |
| 3~d | 一 | 一.ㄋ.ㄱ |
| 4~e | ノ | ノ.丶.ノ.ノ./ |
| 5~f | 丶 | 丶.丶.丶.丶 |
| 6~g | ㇀ | ㇀.✓ |
| 7~h | レ | レ.レ.㇄.ㄴ |
| 8~l | 丶 | 丶.丶.丶 |
| 9~j | ㄋ | ㄋ.ㄗ | wherein the representing strokes and the subsidiary strokes are inputted by clicking the keys at the first column, the Chinese character is inputted by clicking a key representing the first stroke of a traditional recognized component of a Chinese character to be inputted and, a first and a last strokes a nontraditional recognized component of the Chinese character; and if the Chinese character has no non-traditional recognized component, the first stroke and a last stroke of the Chinese character are used, and wherein a first and a last strokes of a Chinese character is used an input, and then a first phonetic symbol is used as an input, wherein all the phonetic symbols are arranged on the numerical keyboard, in inputting of the phonetic symbols, the former phonetic symbols are directly inputted by clicking the keys and the other phonetic symbols are inputted by pressing the key an then an auxiliary key; the arrange of the Chinese characters are:

key 0. ㄅ、ㄏ、ㄙ、ㄋ
key 1. ㄆ、ㄐ、ㄚ、ㄤ
key 2. ㄇ、ㄑ、ㄛ、ㄥ
key 3. ㄈ、ㄒ、ㄜ、ㄦ
key 4. ㄉ、ㄓ、ㄝ、一
key 5. ㄊ、ㄔ、ㄞ、ㄨ
key 6. ㄋ、ㄕ、ㄟ、ㄩ
key 7. ㄌ、ㄖ、ㄠ
key 8. ㄍ、ㄗ、ㄡ
key 9. ㄎ、ㄘ、ㄢ thus, the first phonetic symbol of each key is inputted by directly inputting the key, while other phonetic symbols are inputted by an auxiliary key; the auxiliary key is selected from one of a first set formed by key a, key b, and key c, and a second set formed by key 1, key 2, and key 3 and a third set formed by keys below the phonetic symbol to be inputted with an order from the left to the right.

5. The method as claimed in claim 4, wherein to avoid some Chinese characters have same input keys, the traditional recognized components of such as " ", " "and " ", which is belonged to other sets so that the inputs of keys are more flexible.

6. The method as claimed in claim 4, wherein for words which have the same first stroke and last stroke, such as the words "凵", "國", "出", "囚" the last stroke is dependent to the first stroke; the stroke 11 of the word "凵" is input by the whole shape; and the words of "皿", "用", "母", etc. have their strokes 11 instead of the word "口".

7. The method as claimed in claim 4, wherein if the traditional recognized component or non-traditional recognized component has only one stroke, then the stroke is used as an input and no other input is used; if same traditional recognized components are occurred in one word, then only one is used in keying; and for example the Chinese characters "森", "淼" "參", "品".

8. The method as claimed in claim 4, wherein the input keys for all the Chinese characters are registered to a dictionary which can be checked by users so that when the user do not determine the input keys.

9. The method as claimed in claim 4, wherein the Chinese characters having same input keys are divided into at least one set according to the order of traditional recognized component; and the order is that the traditional recognized components with fewer strokes are arranged firstly and then the Chinese characters with more strokes are arranged next.

10. The method as claimed in claim 4, wherein for the Chinese characters with the same input keys, the phonetic symbols are emitted by the computer, the user can input the key representing the phonetic symbols, or all the numbers of the traditional recognized components in the Chinese characters are inputted, if there is still Chinese characters with the same input keys, the second strokes, third strokes, fourth strokes, etc., of the traditional recognized components in these Chinese characters are inputted.

11. The method as claimed in claim 4, wherein the strokes for the Chinese characters are expandable to more than 10 sets so as to reduce the repeats of the Chinese characters having same input keys.

12. The method of claim 11, wherein 37 phonetic symbol and the phonetic symbols of the Chinese characters are arranged on the numerical keyboard.

13. The method as claimed in claim 4, wherein the strokes are arranged in different keys, which are arranged based on the similarity of shapes of the strokes with the keys (0 to 9, and a to j), wherein the similarity are listed below:

0 is similar to 只，口，
1 is similar to l、丨、丶
3 is similar to 3、7
4 is similar to
5 is similar to
6 is similar to ✓
7 is similar to ㄴ
8 is similar to ＼
9 is similar to ㄟ these similarities used to arranged the strokes to the keys from keys to key 9.

14. The method of claim 4, wherein 37 phonetic symbol and the phonetic symbols of the Chinese characters are arranged on the numerical keyboard.

* * * * *